Patented Oct. 1, 1940

2,216,207

UNITED STATES PATENT OFFICE 2,216,207

CONTROL OF SETTING PERIOD OF GYPSUM PLASTERS

Paul L. Menaul, Duncan, Okla.

No Drawing. Application February 11, 1939,
Serial No. 255,961

5 Claims. (Cl. 106—28)

Dehydrated gypsum (calcium sulphate hemihydrate) more commonly known as plaster of Paris, when finely ground and mixed with sufficient water to provide for rehydration, sets to a hard mass and is useful for many purposes. As is well known, this set or hardening takes place very rapidly and with considerable development of heat, properties which limit its usefulness for many purposes to which it might otherwise be applied.

For example, in the drilling of oil wells by the so-called rotary method, it often occurs that circulation is lost: i. e., that the drill encounters porous underground formations into which the drilling fluid escapes instead of returning to the surface. These leaks must be healed before drilling can proceed further, as by introducing into the drilling fluid flocculent solids which will choke and seal off the porous wall, or by filling the pores and interstices in the wall with a cementitious material which will harden under water.

For the second named method, which is usually the most practicable, many cementitious materials have been tried, but all of them have been found wanting in one respect or another. Portland cement is most commonly used, but has the serious disadvantage that it sets so slowly that considerable rig time is lost; further, it will not set while in motion and for that reason, particularly if the leaks in the wall be large, it may be difficult or impossible to stop them in this manner. The addition of finely pulverized bentonitic clays increases the viscosity of the cement slurry and will take care of some cases in which the cement alone will not answer, but the strength of the cement after setting is thus depreciated and in many cases the increase in viscosity does not suffice to hold the cement in place until the initial set has occurred.

Plaster of Paris has the desirable property of setting while in motion; so that a slurry of plaster of Paris introduced into the well and in process of flowing out through the leakage channels will set in these channels and heal the leaks with a considerable degree of certainty. However, plaster of Paris alone is useless for this purpose, as it hardens with such extreme rapidity that it is practically impossible to pump it to the bottom of a well of any great depth.

Many attempts have been made to retard the hardening of plaster of Paris but these, again, have not been wholly successful. Thus, for example, finely ground calcium oxide has been mixed with plaster of Paris in various proportions and is effective in retarding the set, but this mixture has several disadvantages in practice. Thus, if the mixing water or the ground water be acidic (as for example, by containing dissolved carbon dioxide) the alkaline retarder is neutralized and its normal effect nullified. Again, mixtures of plaster of Paris with alkalis or alkaline earths are difficult to control as to setting time, and may freeze in the tubing through which they are introduced or leak out of the well according as they may set too rapidly or too slowly. Boric acid and the borates have also been used for this purpose, but their use results in a soft plaster after setting. In general terms, the retarders heretofore used have been deficient in the control of the setting period, and produce a solid body which is deficient in hardness or one which loses its strength after a short time, or which shrinks after setting, or the setting time is uncontrollably affected by pressure and temperature conditions which vary from well to well.

I have discovered that a mixture with plaster of Paris or other plaster consisting substantially of dehydrated gypsum, of the sodium or other alkali-metal salts of hexa-metaphosphoric acid $(HPO_3)_6$, is free from all of the above objections and that, in this manner, the setting time can be extended almost at will and may be controlled with the greatest degree of accuracy.

Ordinarily, gypsum plasters set and harden in from ten to twenty minutes. If, however, about one part by weight of the sodium salt of hexa-metaphosphoric acid be mixed with one thousand part by weight of the dry gypsum plaster, the set is delayed for about one hour; with two parts of the sodium salt per thousand the set is delayed about two hours, and in similar manner the set may be delayed for an additional hour for each additional part per thousand, up to five hours or even more. If the acid itself, or a salt other than the sodium salt be used, the dosage should be diminished or increased in proportion to the molecular weights.

The delayed gysum plaster sets under water and is not affected by the presence of oil in contact with the fluid mass. By delaying the hardening the evolution of heat is distributed over a longer period. Neither the setting rate nor the properties of the hardened plaster are affected in any manner by pressures up to 5,000 pounds per square inch nor by well temperatures up to 220° Fahr. None of the normal constituents of ground water or of any water used in mixing have any effect on the rate of setting or on the properties of the hardened material. The hardening effect is not negated by motion nor even by turbulence, as for example when the plaster is used for controlling wild wells.

The plaster when set is very hard and dense. Its initial hardness is permanent, that is, is not changed in either direction by aging. There is substantially no shrinkage during or after setting, and in all respects the hardened plaster resulting from this method of procedure is of the best quality.

While it is desirable to incorporate the metaphosphate as a powder, or the acid as a liquid, with the gypsum plaster before it is mixed with water, it is also possible to add the acid or salt to the water with which the plaster is mixed. When this is done, the greatest possible care should be exercised to add only the exact quantity required, because of the extreme effectiveness of the retarding agent.

I claim as my invention:

1. The method of controlling the setting rate of slurries consisting substantially of plaster of Paris and water which comprises adding to said plaster sodium hexa-metaphosphate in the proportion of about 1 pound of said phosphate to 1,000 pounds of said plaster for each hour of desired delay in setting time.

2. A composition of matter: powdered plaster of Paris intermixed with a relatively minute proportion of sodium hexa-metaphosphate.

3. A composition of matter: powdered plaster of Paris intermixed with a relatively minute proportion of an alkali-metal salt of hexa-metaphosphoric acid.

4. The method of sealing water-bearing strata in the drilling of oil wells which comprises: injecting into said strata a slurry consisting substantially of plaster of Paris, water and a minor proportion of an alkali-metal salt of hexa-metaphosphoric acid, and so regulating the proportion of said salt as to cause said slurry to set in a desired time.

5. A method substantially as and for the purpose set forth in claim 4, in which said salt is sodium hexa-metaphosphate.

PAUL L. MENAUL.